United States Patent [19]

Baril et al.

[11] Patent Number: 4,586,310
[45] Date of Patent: May 6, 1986

[54] ANGLED ASSEMBLY OF PROFILES FOR TONGUE AND GROOVE FITTING AND KEY LOCKING

[75] Inventors: Jacques Baril, La Murette; Georges Chailleux, Chevry-Cossigny, both of France

[73] Assignee: Cegedur Societe de Transformation de l'Aluminium Pechiney, Paris, France

[21] Appl. No.: 638,477

[22] PCT Filed: Dec. 13, 1982

[86] PCT No.: PCT/FR82/00210
§ 371 Date: Jul. 31, 1984
§ 102(e) Date: Jul. 31, 1984

[51] Int. Cl.⁴ .............................................. E04B 1/58
[52] U.S. Cl. ..................... 52/766; 403/374; 403/358; 29/155 R; 29/525; 29/526 R; 52/775; 52/781; 52/665; 52/693
[58] Field of Search ............... 52/690, 664, 665, 693, 52/766, 780, 781, 775; 403/374, 409, 358, 356, 369; 29/155 R, 525, 526 R

[56] References Cited
U.S. PATENT DOCUMENTS

| 752,462 | 2/1904 | Morey | 403/358 |
| 2,566,622 | 9/1951 | Millier | 52/690 |
| 3,190,408 | 6/1965 | Petterson | 52/766 |

FOREIGN PATENT DOCUMENTS

| 686282 | 12/1939 | Fed. Rep. of Germany | 52/766 |
| 1475734 | 2/1967 | France |  |
| 2165818 | 8/1973 | France |  |
| 2226029 | 11/1974 | France |  |
| 2510682 | 2/1983 | France | 403/374 |
| 261299 | 8/1949 | Switzerland | 52/766 |

Primary Examiner—John E. Murtagh
Assistant Examiner—Caroline Dennison
Attorney, Agent, or Firm—Dennison, Meserole, Pollack & Scheiner

[57] ABSTRACT

Device for assembly of profiles by a groove, tongue fitting, with locking by key, which avoids the risks of tongue and key sliding along groove. The device consists of making one of the male elements, tongue or key, longer than the other, in the direction of the generatrices of groove, and making one of the side surfaces of the longer element concave along the generatrices of groove. The invention allows realization of trellis constructions having oblique bars.

10 Claims, 5 Drawing Figures

ANGLED ASSEMBLY OF PROFILES FOR TONGUE AND GROOVE FITTING AND KEY LOCKING

French Pat. No. 2 226 029 discloses trellis-like metal constructions such as scaffoldings, frames or simply railings or parapets, constituted of profiles which are not assembled by welding, rivets or bolts, but rather by tongue and groove arrangements locked by keys fitted perpendicular to and sunk by force into the groove. The use of presses or calibrated jacks allows locking keys to be sunk in with well-defined force and assures a good safety coefficient for this type of assembly. Moreover, the key is generally provided with a shoulder which facilitates its driving into the groove and simultaneously limits this driving in and thus limits the deformation of the groove to a predetermined value.

Large constructions assembled rapidly and safely at the worksite are thus realized, even with inexperienced personnel.

However, it is to be noted that metal constructions using angled assembly of two profiles by groove, tongue and locking keys are hardly known, other than for trellis-like rectangular metal structures such as ladders, of which the rungs are assembled at right angles to the legs.

In fact, with these groove, tongue and key assemblies, the tightening applied by the key to the tongue assures sufficient jamming in the case wherein the constituent elements are subject to flexing, traction or compression. On the other hand, under the effect of reciprocal stresses, or vibrations, the tongue and the key slide along in the groove, one avoids using a force to support the assembly which has a component parallel to the generatrices of the groove. Because of this, trellis constructions having bars which are oblique to the flanges, which are assembled by a groove, tongue and locking key device, are hardly known.

The object of the present invention is a process and a device allowing oblique assemblies by groove, tongue and key, with a good safety coefficient, both transverse to the groove and also longitudinally along the groove generatrices.

The process of angled assembly of two profiles or structural members, according to the invention, consists of preventing any possibility of sliding of the tongue longitudinally in the groove and making one of the male elements or components introduced into the groove, i.e. either the tongue or the key of greater width than the other or having, a greater length than the other, in the direction of the groove generatrices, and giving one of the sides of the longer element a concave shape along its width, i.e. parallel to the groove generatrices. This side, instead of being essentially flat, is slightly curved inward at each end and the longer male element, instead of having a cylindrical shape of its generatrices parallel to those of the groove, is broadened at its two ends in the areas exceeding the length of the other male element. Thus, if one or the other of the two male elements or components tends to be moved along the groove, it is blocked by the enlarged end of the longer element. One has a sort of double key locking, the one, as in the prior art, locking perpendicular to the groove generatrices, and the other along these generatrices. This process thus leads to the realization of angled assembly devices of two profiles or members by fitting of a tongue into a groove which is integral with one of the profiles or members, the tongue being integral with the other, then locking of the tongue in the groove by a key which is sunk perpendicularly into the groove. To avoid longitudinal sliding of the tongue and key in the groove despite their force locking, one of the male elements of the assembly, the tongue or the key, is longer than the other, in the direction of the generatrices of the groove. One of the sides of the longer male element also is of concave shape along its length.

In the contact zone between the two male elements, tongue and key, the contact surfaces of these two elements are generally flat, and it is only beyond this flat contact zone that the surface of the longer element becomes concave at each end, allowing each of the ends of this longer element to be progressively broadened out, forming a sort of locking nose to block the length of the groove. It is possible to say that the surface of this longer element has a "flat concave" shape.

Thus, along a length essentially equal to the shorter male element, the tongue and the key are locked in the groove along the essentially flat surfaces. If there is a thrust of one of the male elements to slide longitudinally in the groove, then it is blocked by one of the two noses of the longer element.

The concavity of the side surface of the longer element can be such that the extra thickness at its ends is essentially equal to the thickness of the other male element without however being at all greater. Thus it is possible to have a certain pinpoint blocking of both ends of the groove of the concave male element, which further prevents longitudinal sliding.

The invention will be better understood from the following description of particular examples of devices according to the invention. This nonlimiting description is illustrated by the attached drawings.

Figure 1:
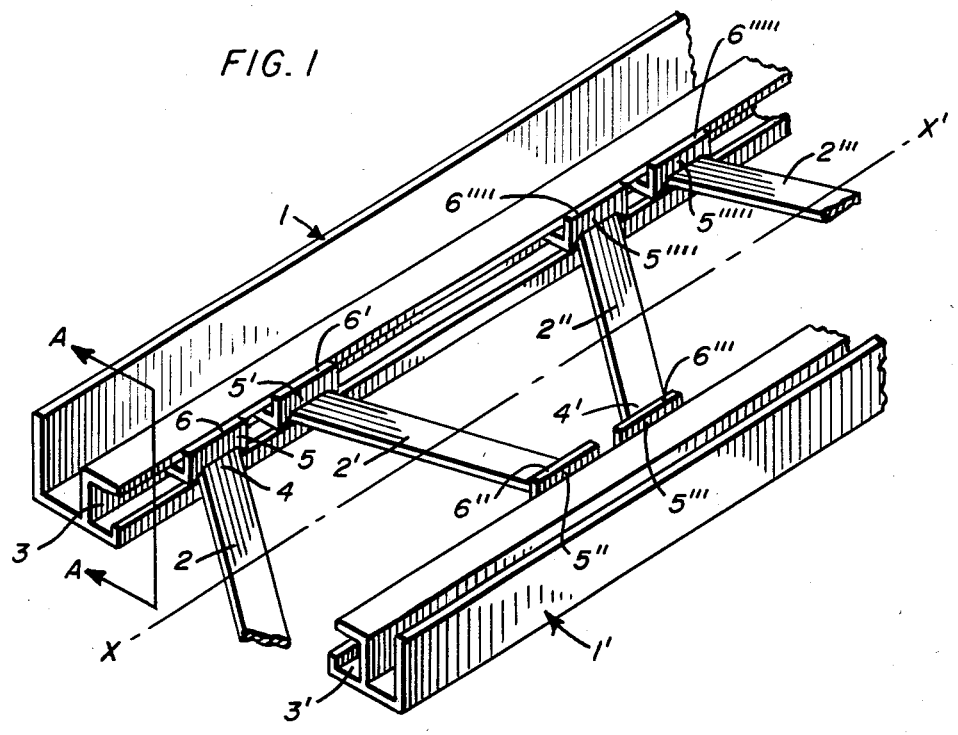
FIG. 1 shows a perspective view of a trellis girder with oblique bars.

FIG. 1 shows a perspective view of a trellis girder of metal, made up of two flanges 1-1' with angles and oblique flat crossbars 2-2'-2"-2"', arranged obliquely in relation to flanges 1-1'. Each of the facing wings of flanges 1-1' has a groove 3-3' forming two facing channels. Crossbars 2-2'-2"-2"' are not fixed to flanges 1-1' by welding or by bolts, but rather by fitting of their ends, which are tongues 4-4', in grooves 3-3', where they are blocked by keys 5-5'-5"-5"'-5""-5""'. Of these, both to facilitate their placement and to limit their insertion into grooves 3-3', and thus to limit the force exerted for locking of the assemblies, each key has a shoulder 6-6'-6"-6"'-6""-6""', most visible in FIG. 2. For reinforcement, grooves 3-3' have an L-shaped cross section, and the fitting tongues 4 have fillets or edge ridges 7 which have extra thickness, which hook into the bottom of L-shaped grooves 3-3'.

Figure 3:
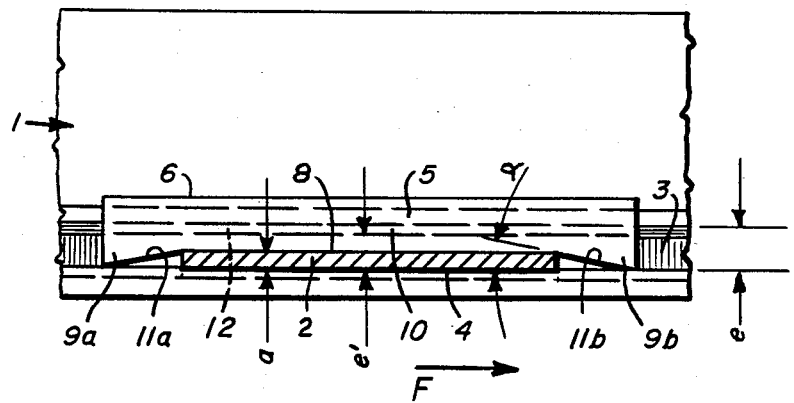
FIG. 3 shows a partial cross section of the girder through a plane AA of FIG. 1 perpendicular to the plane of the girder and parallel to its large axis, in larger scale.

FIG. 3 shows that, longitudinally in groove 3, key 5 is longer than tongue 4 at the end of bar 2. The side 8 of key 5, which engages on tongue 4, is concave at its two ends 9a–9b, where key 5 has an extra thickness almost equal to the thickness "a" of the other male element, here, tongue 4. Thus, even in the absence of tongue 4, key 5 cannot be placed in place in groove 3 without being slightly forced into the groove and being subjected to a very slight deformation of its two ends 9a–9b.

The central part 10 of key 5 is of complementary shape to that of groove 3 and tongue 4 with an extra thickness intended to cause deformation when it is opened to a distance e' which is defined by computation, and groove 3 is of the initial thickness e.

The concavity of side 8 of key 5 generally speaking is not continuous but rather is formed by two planes 11a–11b which are inclined in relation to the first central part 10 of side 8. This is what is intended by "flat concave" shape.

To have good longitudinal fitting of tongue 4 against ends 9a–9b of key 5, the angle of inclination alpha of planes 11a–11b in relation to the central part must be less than 7°. Thus, under the effect of a force F parallel to groove 3, tongue 4 tends to slide longitudinally in the groove; the tongue does not abutt sharply against key end 9b, but slides longitudinally thereon, separating the edges of groove 3, thus coming to block said groove.

Figure 2:
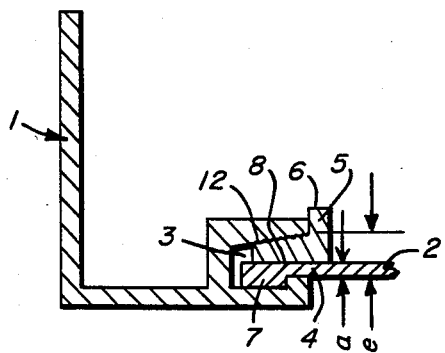
FIG. 2 shows a partial cross section of the girder through a plane perpendicular to its large axis XX', in larger scale.

For better locking of key 5, longitudinal striations are made on the surface 12 which is applied to the inclined surface 4 of the groove, as shown in FIG. 2.

Figure 4:
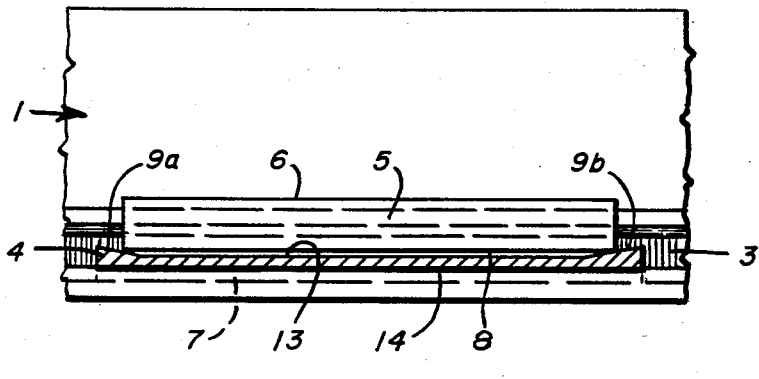
FIG. 4 shows a view similar to FIG. 3, with a variation of embodiment of the invention wherein the tongue is longer than the key, in the direction of the groove generatrices.

FIG. 4 shows a cross section AA of a variation of the invention wherein tongue 4 is longer than key 5. In this case, it is the side surface 13 of tongue 4 which is concave. Key 5 is blocked only by ends 9a–9b of tongue 4 which are slightly deformed. This solution is not the most desirable. It would be preferable that the flat part of surface 13 of tongue 4 have a length equal to that of surface 8 of key 5 and that maximum contact be retained between tongue and key, on all of their engaging surfaces 8–13.

In the case shown, surface 13 of tongue 4 facing key 5 is concave, but this could as well be the opposite surface 14, or even simply the surface corresponding to fillet 7 which would then include an extra thickness at its two ends. In this case, the tongue is deformed during insertion of the key, in a concavity analogous to that shown in FIG. 4.

In the examples shown, the bars of the trellis girders are flat profiles or members, but they could as well be other types of profiles, e.g. T profiles of which the vertical bar of the T would be sectioned at the ends so that the horizontal bar of the T forms a tongue which can engage in a groove of the corresponding flange of the web girder.

Figure 5:
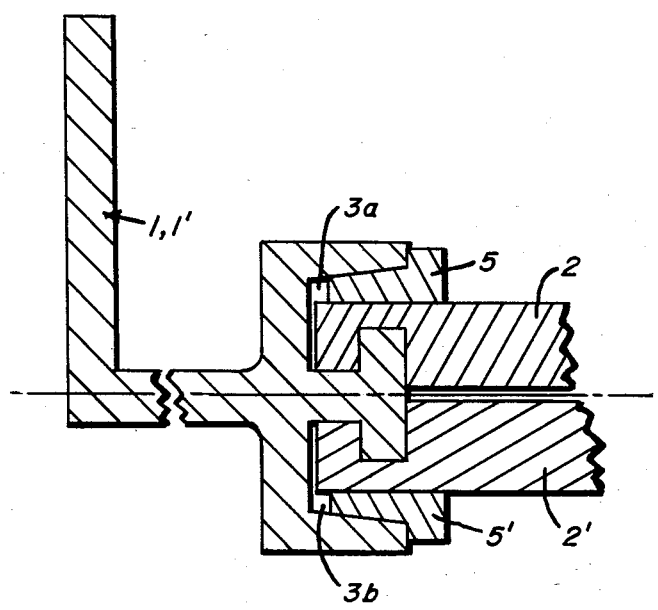
FIG. 5 shows a cross section similar to that of FIG. 2 wherein each flange has two parallel grooves.

Finally, so that the trellis bars can be arranged along the girder in opposite inclination to the plane of the girders, as near to each other as desired, it is important to provide two parallel grooves 3a–3b as in FIG. 5 in the flanges. Each of the grooves 3a or 3b would be fitted with bars inclined all in one direction. This configuration of flanges 1–1' allows realization of trellis girders of which the axes of bars 2–2' intersect on the axes of flanges 1–1'.

We claim:

1. An assembly comprising a first structural member having an elongate groove defined therein, and two insert components, at least portions of which are closely received in said groove, said two insert components comprising a second structural member and a key member, said portions include a groove-received tongue portion on said second member and a groove-received side portion on said key member, one of said groove-received portions being of a greater width, lengthwise along the groove, than the other groove-received portion, the wider of said portions having a surface generally concave along the width thereof to define opposed edge areas on the greater width portion which are of greater thickness than the central area of the greater width portion for positioning beyond the opposed side edges of the other groove-received portion, whereby lengthwise movement of the portions along the groove is precluded.

2. The assembly of claim 1 wherein the central area of the greater width portion presents a substantially planar surface, the other groove-received portion having a substantially planar surface generally engaging the central area surface of the wider portion.

3. The assembly of claim 2 wherein the opposed edge areas on the greater width portion have a thickness generally equal to the thickness of the other groove-received portion.

4. The assembly of claim 3 wherein the concave surface is defined by the substantially planar surface on the central area and opposed edge area surfaces at an angle of inclination relative to the central area surface of less than 7°.

5. The assembly of claim 4 wherein a trellis girder is defined, said first structural member comprising an elongate flange of said girder, said second member defining an oblique crossbar, an end of which defines said tongue portion.

6. The assembly of claim 5 wherein said trellis girder has two parallel elongate grooves defined in said first structural member, each groove receiving an oblique crossbar and a cooperating key member.

7. The assembly of claim 1 wherein said key member includes said wider portion.

8. The assembly of claim 1 wherein said generally concave surface is received against a corresponding surface of the other groove-received portion.

9. The assembly of claim 1 wherein the opposed edge areas on the greater width portion have a thickness generally equal to the thickness of the other groove-received portion.

10. A process for assembling one end portion of an oblique member in an elongate groove utilizing a key member portion; comprising forming one of said end portion and said key member portion of a greater width than the other; whereby said greater width portion includes opposed side areas laterally positionable beyond opposed sides of the other portion, making the opposed side areas of said greater width portion of greater thickness than the central area therebetween, and force-engaging both said portions in the groove with said other portion overlying said central area and with the greater thickness side areas positioned laterally outward of the opposed sides of the other portion and in at least partial overlying relation thereto.

* * * * *